Figure 1:
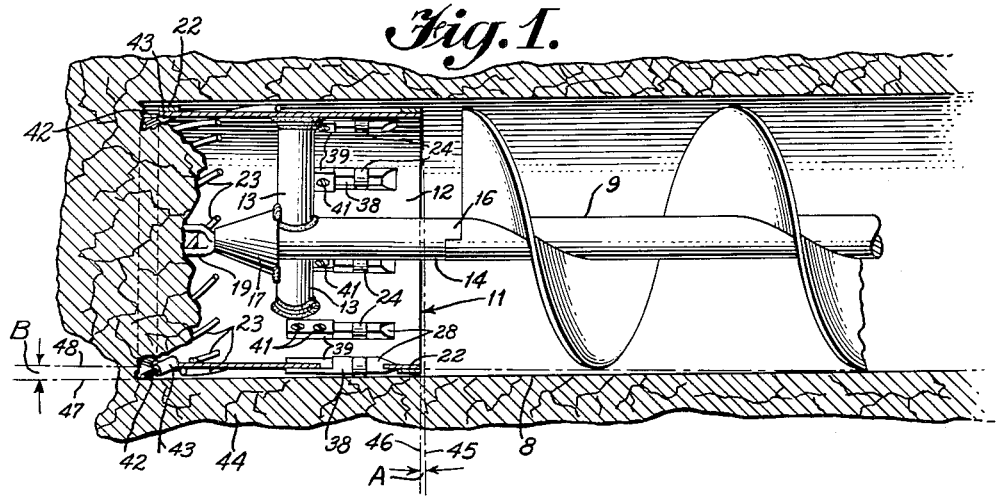

April 10, 1956 F. B. BACA 2,741,462
CUTTER HEAD

Filed May 23, 1952 3 Sheets-Sheet 1

INVENTOR.
*Florentino B. Baca*
BY
*L. Ronald Myers*
ATTORNEY

DIRECTION OF ROTATION

INVENTOR.
Florentino B. Baca
BY
ATTORNEY

April 10, 1956  F. B. BACA  2,741,462
CUTTER HEAD
Filed May 23, 1952  3 Sheets-Sheet 3
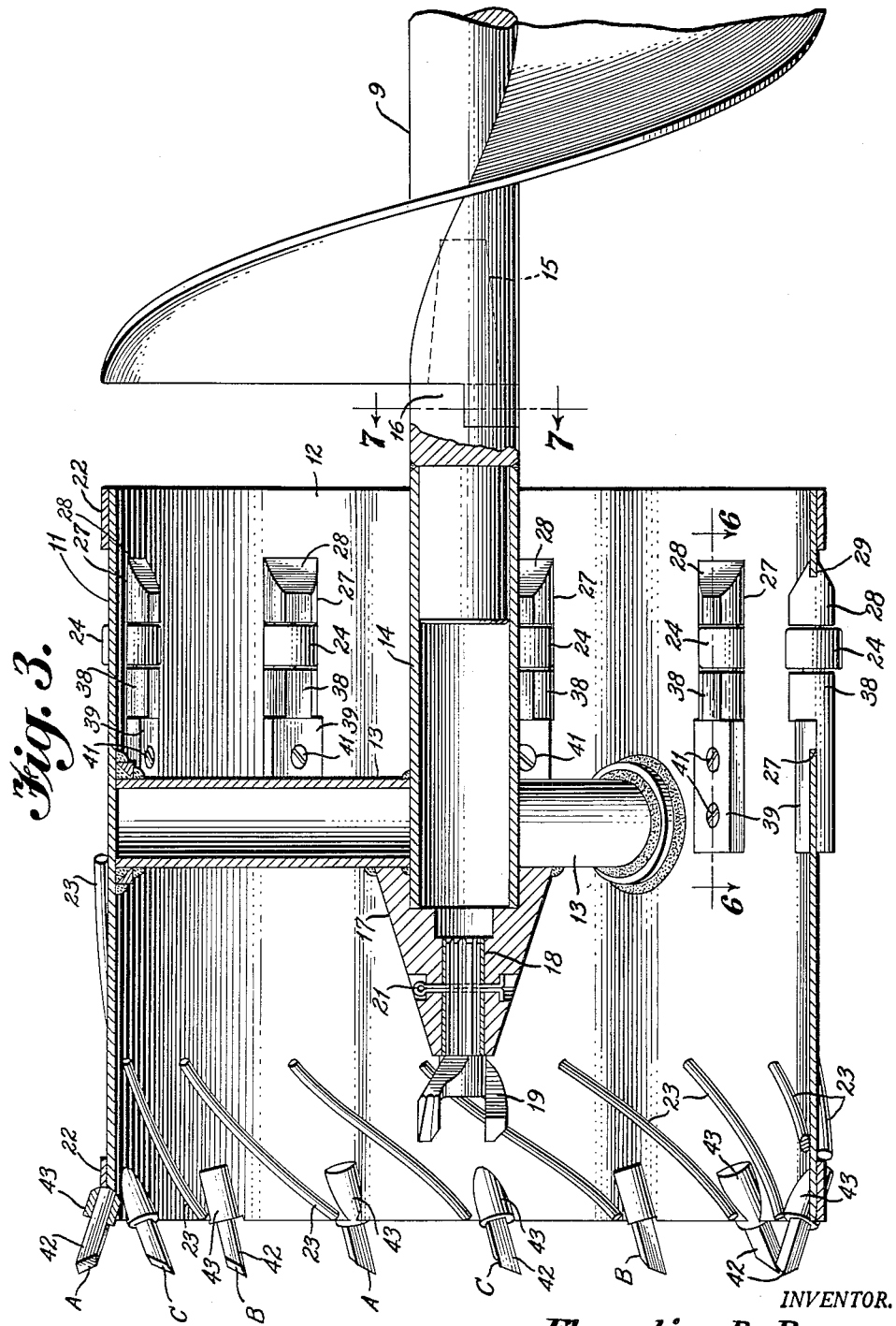
INVENTOR.
Florentino B. Baca
BY
ATTORNEY

United States Patent Office 2,741,462
Patented Apr. 10, 1956

2,741,462

CUTTER HEAD

Florentino B. Baca, Ottumwa, Iowa, assignor to Cardox Corporation, Chicago, Ill., a corporation of Illinois Application May 23, 1952, Serial No. 289,648

5 Claims. (Cl. 255—69)

This invention relates to new and useful improvements in cutter heads and deals more specifically with cutter heads which are particularly adapted for use in connection with auger drill trains in horizontal tunneling or mining operations.

In recent years it has become common practice to employ auger machines for various horizontal earth boring and mining operations. The drill train normally used in connection with such machines consists of a cutter head mounted at the end of an auger section or at the end of a plurality of assembled auger sections. The hole bored by the drill train may under some circumstances reach a depth up to 100 feet or more and, when the available working space at the machine is limited as in a mine entry, a relatively large number of short auger sections must be assembled into the completed drill train. It will be readily apparent that when so assembled there will be a certain amount of flexibility in the drill train. The drilling of holes to such great depths also requires that the diameter of the hole which is formed by the cutter head be slightly greater than the diameters of the cutter head body and the auger sections to prevent undue friction with the bore of the hole.

Since the cutter head forms a hole having a greater diameter than that of its body portion and the auger sections and since the assembled auger sections are sufficiently flexible to permit their lower sides to rest on the bore due to their weight, previous types of cutter heads have had a tendency to drift downwardly. In other words, the weight of the auger sections will apply a force to the cutter head in a radially downward direction so that the teeth at the front of the cutter will form a bore, the bottom of which is at a progressively lower level as the drill train is advanced. Attempts have been made to compensate for this downward drift by starting the drill hole in an upwardly inclined direction but such attempts have been unsuccessful because the drill has formed an arcuate path and continued to drift downwardly.

The primary object of this invention is to provide a cutter head which may be advanced to form a straight horizontal drill hole of great depth.

A further object of the invention is to provide a cutter head which is supported during its advancement to form a straight horizontal drill hole of great depth with a minimum frictional engagement between the cutter head and the drill hole.

A further object of the invention is to provide a cutter head which will form a drill hole of sufficient diameter to permit free rotation of the cutter head therein and which will support itself in the drill hole for advancement in a straight horizontal direction to a great depth.

Still another object of the invention is to provide a cutter head which will form substantially a horizontal drill hole of a sufficient diameter to permit free rotation of the cutter head therein and which will support itself in the drill hole with a minimum of frictional engagement for advancement in a straight direction and to a great depth by a drill train at least one portion of which rests upon the bottom side of the drill hole.

Other objects and advantages of the invention will become apparent during the course of the following description.

Figure 6:
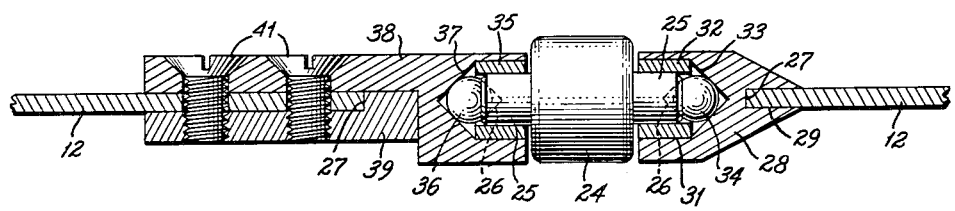
Figure 7:
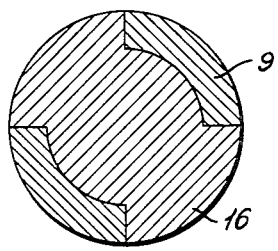
Figure 2:
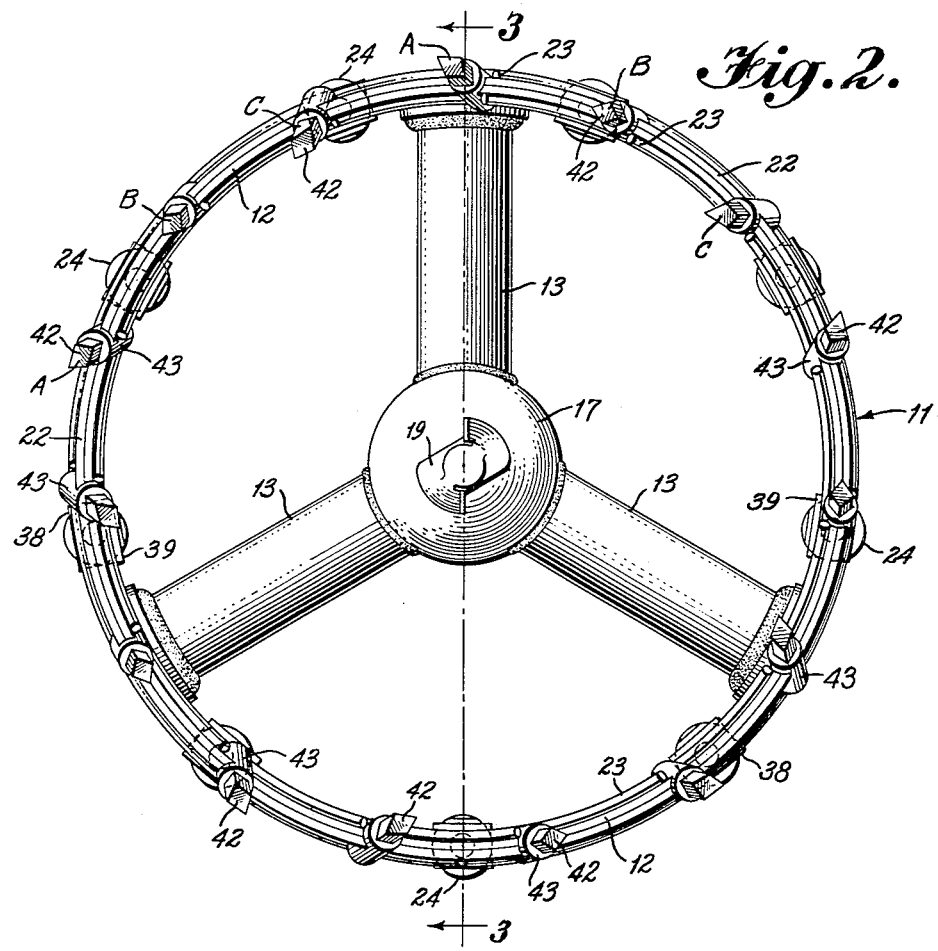
Figure 4:
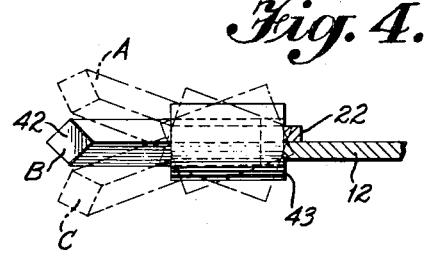
Figure 5:
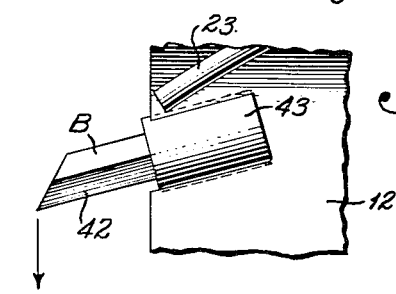

In the accompanying drawings forming a part of this specification and in which like reference characters are employed to designate like parts throughout the same, Figure 1 is a vertical sectional view of a cutter head embodying the invention in its operative position in a drill hole, Figure 2 is an end elevational view of the cutter head illustrated in Fig. 1, Figure 3 is a vertical sectional view taken on line 3—3 of Fig. 2, Figure 4 is a detailed view showing the three different settings of the teeth on the cutter head, Figure 5 is a fragmentary side elevational view of one of the teeth, taken from inside the body of the cutter head, Figure 6 is a fragmentary sectional view taken on line 6—6 of Fig. 3, and Figure 7 is a transverse sectional view taken on line 7—7 of Fig. 3.

In the drawings, wherein for the purpose of illustration is shown a preferred embodiment of this invention, and first particularly referring to Fig. 1, there is illustrated the outer end portion of a drill train in its operative position in a horizontal drill hole designated by the reference character 8. The drill train is formed of one or more auger sections 9 and a cutter head 11 which is rigidly connected to the auger section 9 at the outer end of the drill train. The drill train is rotated and advanced by any of the conventional types of drilling machines, not illustrated.

Referring now to Figs. 2 to 7, inclusive, for a detail description of the cutter head 11, the cylindrical body member 12, open at both ends, is provided with struts 13 which are rigidly connected to the inner surface of the body member and extend radially inwardly therefrom for connection with the axially positioned coupling member 14. One end portion of the coupling member 14 extends rearwardly from the inner end of the body member 12 and is provided with a tapered shank 15 and jaws 16 which engage and cooperate with mating members on the auger section 9, as illustrated in Fig. 7, to rigidly connect the body member to the auger section. The opposite end of the coupling member 14 has mounted thereon a conical breaker 17 having a splined axial opening 18 formed therein for receiving the breaker bit 19 which is held against axial movement by a cotter pin 21, or the like, extending radially through the conical breaker and the bit.

A wear band 22 is mounted on the periphery at each end of the body member 12 to prevent undue wear at the ends of the cutting head 11. The radially inner and outer surfaces of the body member 12 at the outer end portion of the cutting head 11 have mounted thereon circumferentially spaced beads 23 which are spiraled to feed material from the outer end of the body member toward the inner end of the body member as the drill train is rotated and advanced.

Mounted at circumferentially spaced intervals around the body member 12 near its inner end portion are a plurality of rollers 24. The axes of the rollers 24 are arranged in parallel relationship with the axis of the body member 12 and the peripheral or contact surfaces of the rollers extend radially outwardly from the peripheral surface of the body member so that the rollers collectively define a supporting circle having a greater diameter than that of the body member. As illustrated in Fig. 6, each of the rollers 24 is formed with axially extending lugs 25 on its opposite ends and the outer end of each of the lugs has formed therein a conical indentation 26.

Rectangular apertures 27 are formed in the body member 12 for receiving the roller mounting brackets 28, each of which has a notch 29 in one of its ends for engaging the portion of the body member 12 adjacent the inner end of the rectangular opening. The opposite end of each mounting bracket 28 has a hole 31 drilled therein to receive the annular bushing 32 and the bottom of the hole is formed with a conical thrust surface 33 for engagement with a ball 34. The lug 25 at one end of each roller 24 is fitted into the bushing 32 of its associated mounting bracket 28 with its conical indentation 26 in engagement with the ball 34. The lug 25 at the opposite end of each roller 24 is similarly supported by a bushing 35 and ball 36 which are mounted in the drill hole 37 in the roller mounting bracket 38. The bracket members 38 are securely mounted in the ends of the rectangular apertures 27 opposite the bracket members 28 by clamping members 39 which are each connected to their associated bracket member 38 by a pair of cap screws 41.

Mounted at circumferentially spaced intervals around the periphery at the outer end of the body member 12 are a plurality of cutting teeth 42. As illustrated in Fig. 5, the cutting teeth 42 are mounted in sockets 43 with a slight angle of inclination in the direction of the rotation of the cutting head 11 and all of the teeth extend axially outwardly from the outer end of the body member 12. The teeth 42 are so mounted on the body member 12 as to provide repetitive groups of three successive teeth A, B and C with the teeth A projecting radially outwardly from, the teeth B in the plane of, and the teeth C radially inwardly from the body member, as illustrated in Figs. 2 and 4. The teeth A define a cutting circle having a diameter which is greater than that of the supporting circle defined by the rollers 24.

Referring now to Fig. 1 for a detail description of the manner in which the cutting head 11 operates to permit the straight line drilling of horizontal or substantially horizontal drill holes of great depth, it will be readily apparent that as the cutter head 11 is advanced into the material 44, the teeth 42 will form an annular kerf in the material. As the teeth 42 are advanced through the material, the breaker bit 19 and the cone 17 will be brought into engagement with the portion of the material which lies within the body member 12 to break the material into relatively small pieces which are fed rearwardly through the body member. The material passing through the cutter head 11 will be engaged by the auger section 9 and fed rearwardly out of the drill hole 8 as the drill train is rotated.

In the initial portion of a drilling operation the relatively short drill train is substantially rigid and, since the outer diameter of the cutting circle is greater than the diameters of the body member 12, the supporting circle formed by the rollers 24 and the auger section 9, there will be some clearance between the drill train and the surface of the drilled hole 8. As the length of the drill train is increased to advance it into the drill hole, the weight of the drill train between its cutting surface and the drilling machine will cause its middle portion to sag into contact with the bottom side of the drill hole 8. When this sagging occurs, the axis of the drill train between its point of contact with the side of the drill hole 8 and the point of connection with the cutter head 11 will be inclined through a slight angle relative to the axis of the drill hole 8. Since the auger section 9 is rigidly connected to the cutter head 11 this inclination of the portion of the drill train adjacent the cutter head will cause the plane of the inner end of the cutter head to be tilted at a slight angle out of radial alinement relative to the axis of the drill hole 8. This tilting of the cutter head 11 is illustrated by the angle A between the line 45 drawn radially through the axis of the drill hole 8 and the line 46 in the plane of the inner end of the cutter head 11.

When the cutter head 11 is tilted as described above, the bottom of the suporting circle defined by the rollers 24 will be lowered into alinement with the bottom side of the drill hole 8 and the rollers 24 will support the cutter head 11 and the adjacent portion of the drill train by engagement with the drill hole. The bottom of the cutting circle, however, will be maintained in alinement with the bottom of the initially formed portion of the drill hole 8. In other words, a line extending through the bottom of the cutting circle and through the bottom of the supporting circle will lie at an angle with the axis of the cutting head 11 which is equal to the angle A at which the cutting head is tilted. The angular relationship between the aforesaid line through points on the bottom of the cutting and supporting circles and the axis of the cutting head 11 is illustrated by the angle B between line 47 drawn between the cutting and supporting circles and the line 48 drawn along the bottom of the body member 12 or in parallel relationship with the axis of the cutting head 11.

To summarize the relationship between the angle of tilt A and the angle of support B of the cutter head 11, the angle A may be readily calculated from a measurement of the sag in the drill train. The angle B is determined by the spacing and diameter of the supporting circle relative to the cutting circle. The angle B is equal to the angle A when this spacing and diameter of the supporting circle are such that tilting of the cutter head to its angle A will lower the supporting circle to a position at which the bottom of the circle is at the bottom of the straight, substantially horizontal bore hole. As illustrated in Fig. 1, the line 45, forming one side of angle A, and the line 47, forming one side of angle B, are drawn radially of and along the bottom of the drill hole, respectively, and, therefore, must be at right angles to each other. Similarly, the line 46 and the line 48 of the angles A and B, respectively, are drawn in the plane of the inner end of the cutter head 11 and parallel to the axis of the body member 12 so that these lines are also at right angles to each other. It will be readily apparent, therefore, that the angles A and B between corresponding sides of two right angles must be equal. From the above it will be seen that further extension of the drill train will effect a straight line advancement of the drill hole 8 to its proper depth.

The importance of the rollers 26 in maintaining alinement of the bottom of the cutting circle and the initially formed portion of the drill hole 8 will be readily apparent when the mode of operation of the invention is compared with prior practice. When previous types of cutter heads have been employed, the weight of the drill train adjacent the cutting head urged the latter downwardly into a position at which the bottom of the cutting circle was at a level below that of the initially formed portion of the drill hole 8. Advancement of the drill train, therefore, caused the cutter head to follow an arcuate path, or stated in a different way, to drift downwardly out of its initial axial alinement.

As specific examples of the extent to which drill trains employing conventional types of cutter heads have drifted downwardly, it has been determined that in the drilling of 24 inch diameter holes into a 32 inch seam of coal and with each hole started at an upward angle to compensate for the downward drift of the drill train, the cutter head has drifted to the bottom of the seam of coal at a depth of from 40 to 50 feet. Under the same circumstances, but employing the cutter head of the invention, holes can be consistently drilled to a depth of 100 feet or more without drifting downwardly out of the coal seam.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A cutter head for an auger drill train, comprising a cylindrical body member open at both ends, mounting means positioned coaxially with said body member for rigidly connecting the latter to the outer end of the drill train, support means mounted circumferentially on and in spaced relationship with the outer end of said body member and extending radially outwardly therefrom to form a supporting circle the bottom side of which supports the body member and the adjacent portion of the drill train as the latter is rotated and advanced in a substantially horizontal direction, the weight of the drill train causing the middle portion of the latter to sag and effect tilting of the body member into an axially inclined position at a given angle with the direction of advancement of the drill train, and a plurality of cutting teeth mounted at the outer end of the body member for rotation therewith, said teeth extending radially outwardly to form a cutting circle having a diameter at which a line along the bottom of the bore that is formed by said teeth extends through the bottom of the cutting circle and the bottom of the supporting circle and converges on the axis of the body member at an angle substantially equal to said given angle.

2. A cutter head for an auger drill train, comprising a cylindrical body member open at both ends, mounting means positioned coaxially with said body member for rigidly connecting the latter to the outer end of the drill train, a plurality of circumferentially spaced supporting members mounted on said body member in longitudinally spaced relationship with its outer end and each having a contact surface extending radially outwardly from the body member to form a supporting circle the bottom side of which supports the body member and the adjacent portion of the drill train as the latter is rotated and advanced in a substantially horizontal direction, the weight of the drill train causing the middle portion of the latter to sag and effect tilting of the body member into an axially inclined position at a given angle with the direction of advancement of the drill train, and a plurality of cutting teeth mounted at the outer end of the body member for rotation therewith, said teeth extending radially outwardly to form a cutting circle having a diameter at which a line along the bottom of the bore that is formed by said teeth extends through the bottom of the cutting circle and the bottom of the supporting circle and on the axis of the body member at an angle substantially equal to said given angle.

3. A drill train, comprising a cutter head, a shaft for driving said cutter head, said cutter head having a body member positioned coaxially with and connected to one end of said shaft, a plurality of cutting teeth mounted on the outer end portion of said body member and extending outwardly beyond the periphery of the latter to provide a cutting circle having a diameter equal to that of the bore that is formed when the cutter head is advanced in a straight, substantially horizontal direction, and support means mounted in circumferential alignment on said body member for engaging the bottom wall portion of the bore in spaced relationship with said teeth, said support means extending outwardly from the body member to provide a supporting circle having a diameter less than said cutting circle, the weight of said shaft causing the middle portion of the latter to sag and effect axial tilting of said body member to lower said support means to said position for engaging the bottom wall portion of the bore.

4. A cutter head for a drill train, comprising a hollow body member, mounting means positioned coaxially with said body member for rigidly connecting the latter to the end of the drill train, a plurality of cutting teeth mounted on the periphery of the outer end portion of said body member and extending axially and radially outwardly therefrom to provide a cutting circle having a diameter greater than that of said body member, and means supporting said body member in an axially inclined position when the weight of the connected end portion of the drill train is applied to the body member by operation of the drill train in a substantially horizontal position, said supporting means being mounted in circumferential alignment on said body member in longitudinally spaced relationship with its outer end and extending radially outwardly from the body member to form a supporting circle of lesser diameter than that of the cutting circle.

5. A cutter head for a drill train, comprising a hollow body member, a coupling member mounted coaxially with said body member for rigidly connecting the latter to the end of the drill train, a plurality of cutting teeth mounted on the periphery of the outer end portion of said body member and extending axially and radially outwardly therefrom to provide a cutting circle having a diameter greater than that of the body member, and a plurality of circumferentially spaced members mounted on said body member for supporting the latter in an axially inclined position when the weight of the connected end portion of the drill train is applied to the body member by operation of the drill train in a substantially horizontal position, said supporting members being mounted on said body member in longitudinally spaced relationship with its outer end and each having a contact surface extending outwardly from the body member to form a supporting circle of lesser diameter than that of the cutting circle.

References Cited in the file of this patent

UNITED STATES PATENTS

| 1,326,480 | Dana | Dec. 30, 1919 |
| 1,773,231 | Lawrence et al. | Aug. 19, 1930 |
| 1,905,158 | Craig et al. | Apr. 25, 1933 |
| 2,280,851 | Ranney | Apr. 28, 1942 |
| 2,562,841 | Compton | July 31, 1951 |
| 2,598,518 | Dufilho | May 27, 1952 |

FOREIGN PATENTS

| 577,619 | Germany | June 2, 1933 |